United States Patent
Bedard

[19]

[11] Patent Number: 6,059,360
[45] Date of Patent: May 9, 2000

[54] CAR/BOAT FLOATATION SEAT FOR INFANTS

[76] Inventor: Peter R. Bedard, 290 Drake Ave., New Rochelle, N.Y. 10805

[21] Appl. No.: 09/167,468
[22] Filed: Oct. 7, 1998
[51] Int. Cl.[7] ....................................................... B60N 2/26
[52] U.S. Cl. ........................ 297/250.1; 297/130; 441/130
[58] Field of Search ................................ 297/250.1, 130; 114/363; 441/130

[56] References Cited

U.S. PATENT DOCUMENTS

| | | |
|---|---|---|
| 1,639,607 | 8/1927 | Henry . |
| 2,350,679 | 6/1944 | Hann . |
| 2,623,574 | 12/1952 | Damsch . |
| 3,102,280 | 9/1963 | Williams . |
| 3,154,345 | 10/1964 | Lambrecht . |
| 3,265,438 | 8/1966 | Regan et al. . |
| 3,565,486 | 2/1971 | Channon . |
| 3,620,570 | 11/1971 | Wilson . |
| 3,740,095 | 6/1973 | Nail . |
| 4,179,158 | 12/1979 | Flaum et al. . |
| 4,441,221 | 4/1984 | Giessmann et al. . |
| 4,500,135 | 2/1985 | Kincheloe . |
| 4,601,667 | 7/1986 | Hull . |
| 4,606,728 | 8/1986 | Simpson . |
| 4,627,659 | 12/1986 | Hall . |
| 4,711,490 | 12/1987 | Brand . |
| 4,725,253 | 2/1988 | Politte . |
| 4,798,551 | 1/1989 | Dumonceaux et al. . |
| 4,799,910 | 1/1989 | Kellough . |
| 4,837,869 | 6/1989 | Simmon . |
| 5,005,902 | 4/1991 | Farnworth et al. . |
| 5,224,891 | 7/1993 | Stephens ............................. 441/130 X |
| 5,514,020 | 5/1996 | Gainforth . |

*Primary Examiner*—Anthony D. Barfield
*Attorney, Agent, or Firm*—Lackenbach Siegel

[57] ABSTRACT

A floatable automotive/water craft child safety seat for holding a child weighing generally between 10 pounds and 40 pounds so that the child is protected from injury in the event of sudden movements in both an automotive environment and a marine environment. The floatable child safety seat remains afloat in the water in the event of an emergency on board a water craft so that the head of the child remains above water level. The floatable child safety seat includes a safety seat that meets automotive code requirements for protecting children. The floatable child safety seat includes a support frame holding the safety seat in a generally upright position. The frame also defines a planar surface that is compatible with placing the floatable child safety seat either on the surface of a seat of a motor vehicle or on the surface of a water craft. A floatation structure is secured to the child safety seat so that the child is maintained afloat in water so that the head of the child is positioned above water level. The support frame acts as ballast for maintaining the child safety seat upright in water.

11 Claims, 9 Drawing Sheets

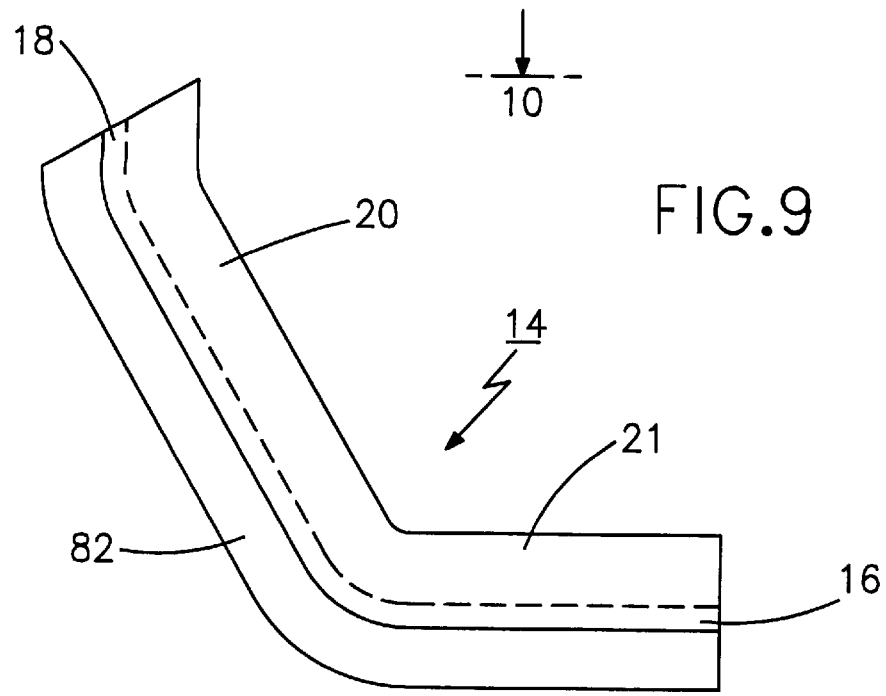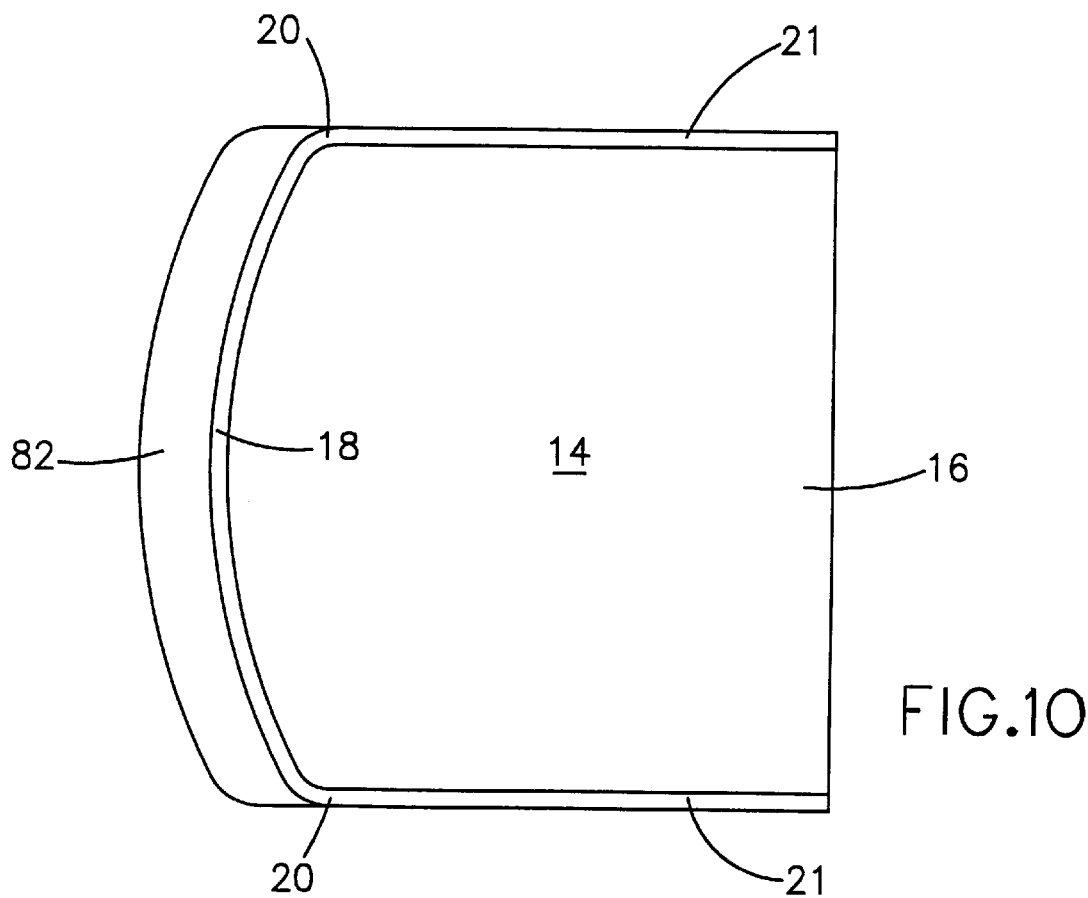

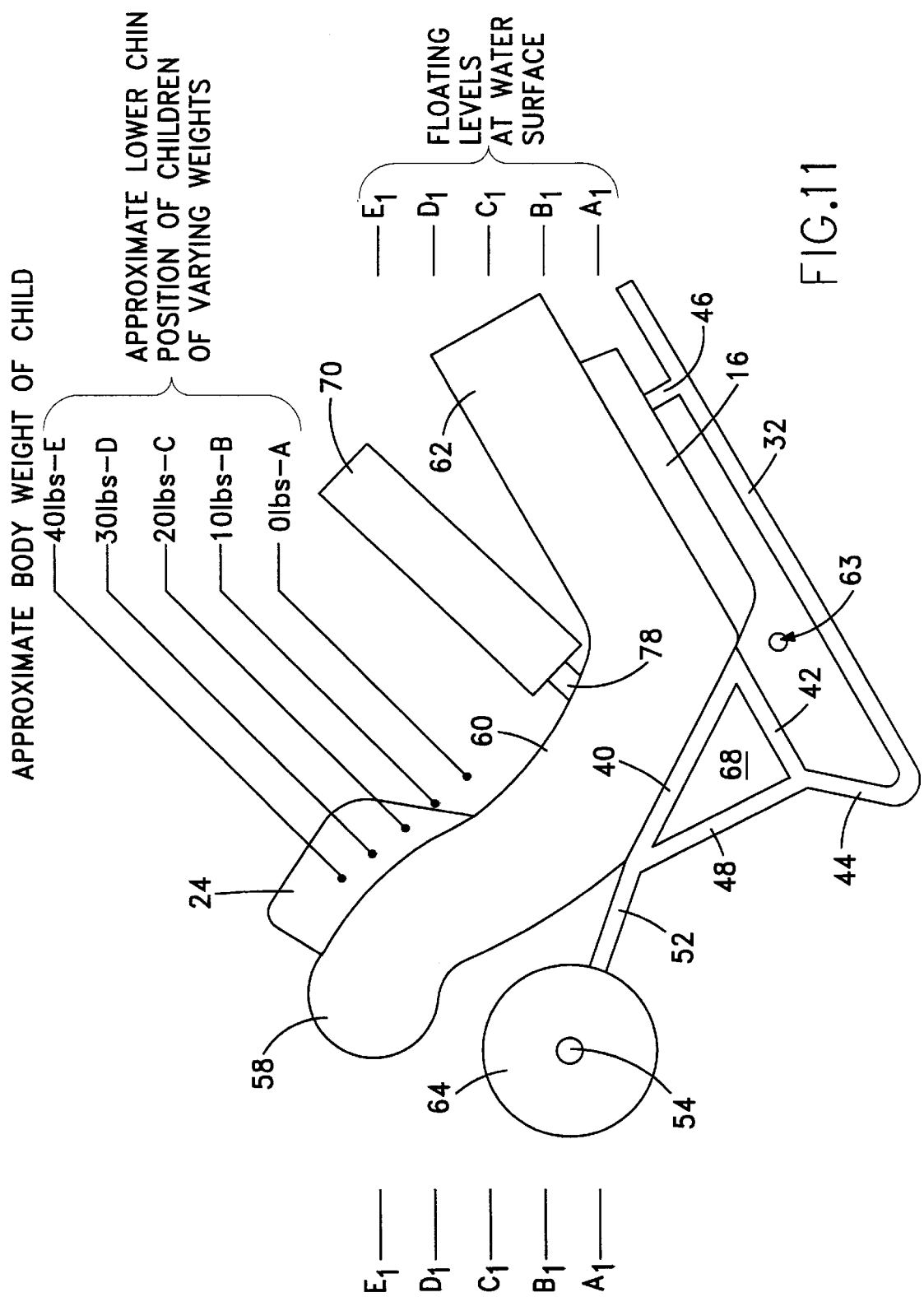

CAR/BOAT FLOATATION SEAT FOR INFANTS

FIELD OF THE INVENTION

This invention relates to the fields of a child safety seat for a motor vehicle and a child safety seat in a water craft environment.

BACKGROUND OF THE INVENTION

Automotive safety seats are well-known in the art of protection of a child from injury in the event of an impact and are mandated by law. A child automotive safety seat generally includes a rigid bucket seat with various types of protective padding. An undercarriage connected to the bucket safety seat is secured to the motor vehicle by means of straps and quick release buckles connected to the surface of the vehicle. Other straps and quick release buckles connected to the bucket seat hold the child in the safety seat. Such motor vehicle safety seats accommodate a range of ages of young children.

Life preserving devices for infants and young children on water craft are considered by many experts in the field to be only marginally dependable. The smallest life preserver now approved by the U.S. Coast Guard for children is merely a smaller version of the adult life preserver with an extension of the preserver floatation material from the shoulder area to the head area. The purpose of the extension is to provide additional floatation protection for a small child's head so as to keep it above the surface of the water and so protect the child from intake of water. Such a safety device is useful when the child is in an infant stage and cannot be placed in a standard child safety seat and so must be constantly cared for by an adult, but an older or more active child is better cared for in a conventional child seat comparable to a standard child automotive safety seat so that the adult can attend to other activities aboard the vessel.

Complete protection of a child aboard a water craft, such as a motor boat or sail boat, as typical examples, would include both 1) protecting the child from being injured from shock during quick movements of the boat in the case of movements in rough water, and 2) protecting the child from the water in the event of an emergency where the child enters the water, Protection of an adult or a child from quick movements of the boat by various types of shock-absorbing seating devices on the boat including child safety seats are well-known.

Floatable safety seats for a child in a marine environment are known. In particular, such a device is described in U.S. Pat. No. 5,514,020 issued to Gainforth. The Gainforth buoyant child safety seat for boats, however, cannot be transferred to a motor vehicle for the reason that the bottom of the described safety seat is provided with ballast stands with ballast weights that prevent the safety seat from being placed upon and secured to the seat of a motor vehicle. Another floatable safety seat for a child is described in U.S. Pat. No. 4,725,253 issued to Politte. The Politte infant safety flotation seat device cannot be used in a motor vehicle since it cannot be placed upon and secured to the seat of a motor vehicle primarily because of metal weights, or ballast, near the bottom of the safety seat. Child safety seats particularly intended for marine use have been described in prior art, such as in U.S. Pat. Nos. 4,709,648; 4,934,303; 5,119,754; and 5,309,881; but none of the latter describe floatation capability.

Protection of a child from injury during rough water conditions in a marine environment and protection of a child from injury in the event of an impact in a motor vehicle are similar enough that the same shock and cushion protection in accordance with mandated child motor vehicle safety seats will provide a child from sudden movement in a marine environment. Child safety seats mandated for motor vehicles, however, are provided neither with floatation material nor with ballast.

SUMMARY OF THE INVENTION

It is therefore an object of the present invention to provide a child safety seat that is usable both in an automotive environment and in a motor vehicle environment in accordance with mandated child automotive safety seat standards and in a marine environment for shock protection in both environments and for floatation protection of the child after entry into the water in the marine environment.

It is also an object of the present invention to provide a quick release child safety seat for a motor vehicle as mandated by law that is also usable in a marine environment for protection of a child from shock during rough water encounters and for floatation protection of the child in case of an emergency entry into the water.

It is a further object of the present invention to provide a safety seat for a child in a marine environment that protects the child from shock during encounters with rough water and also provides floatation protection for the child in the event of an emergency entry into the water, the safety seat also being easily transportable and mountable to a seat or surface of a motor vehicle so that it provides safety protection for the child in accordance with mandated law for child safety seats in the event of vehicular of the vehicle.

In accordance with these and other objects that will become apparent in the course of this disclosure, there is provided a floatable automotive/water craft child safety seat for holding a child weighing generally between 10 pounds and 40 pounds so that the child is protected from injury in the event of sudden movements in both an automotive environment and a marine environment. The floatable child safety seat remains afloat in the water in the event of an emergency on board a water craft so that the head of the child remains above water level. The floatable child safety seat includes a safety seat that meets automotive code requirements for protecting children. The floatable child safety seat includes a support frame holding the safety seat in a generally upright position. The frame also defines a planar surface that is compatible with placing the floatable child safety seat either on the surface of a seat of a motor vehicle or on the surface of a water craft. A floatation structure is secured to the child safety seat so that the child is maintained afloat in water so that the head of the child is positioned above water level. The support frame acts as ballast for maintaining the child safety seat upright in water.

The present invention will be better understood and the objects and important features, other than those specifically set forth above, will become apparent when consideration is given to the following details and description, which when taken in conjunction with the annexed drawings, describes, illustrates, and shows preferred embodiments or modifications of the present invention and what is presently considered and believed to be the best mode of practice in the principles thereof.

Other embodiments or modifications may be suggested to those having the benefit of the teachings therein, and such other embodiments or modifications are intended to be reserved especially as they fall within the scope and spirit of the subjoined claims.

BRIEF DESCRIPTION OF THE DRAWINGS

FIG. 9 is a side view taken in isolation of the bucket seat of the floatable motor vehicle/boat child safety seat shown in FIG. 1 with optional floatation material secured to the bottom of the seat;

FIG. 10 is a front view of the bucket seat shown in FIG. 9; and

FIG. 11 is a side view of the floatable motor vehicle/boat child safety seat shown in FIG. 1 that indicates generally its position in fresh water while empty and holding children of varying weights.

DESCRIPTION OF THE PREFERRED EMBODIMENT

Reference is now made in detail to the drawings wherein the same numerals refer to the same or similar elements throughout.

Figure 1:
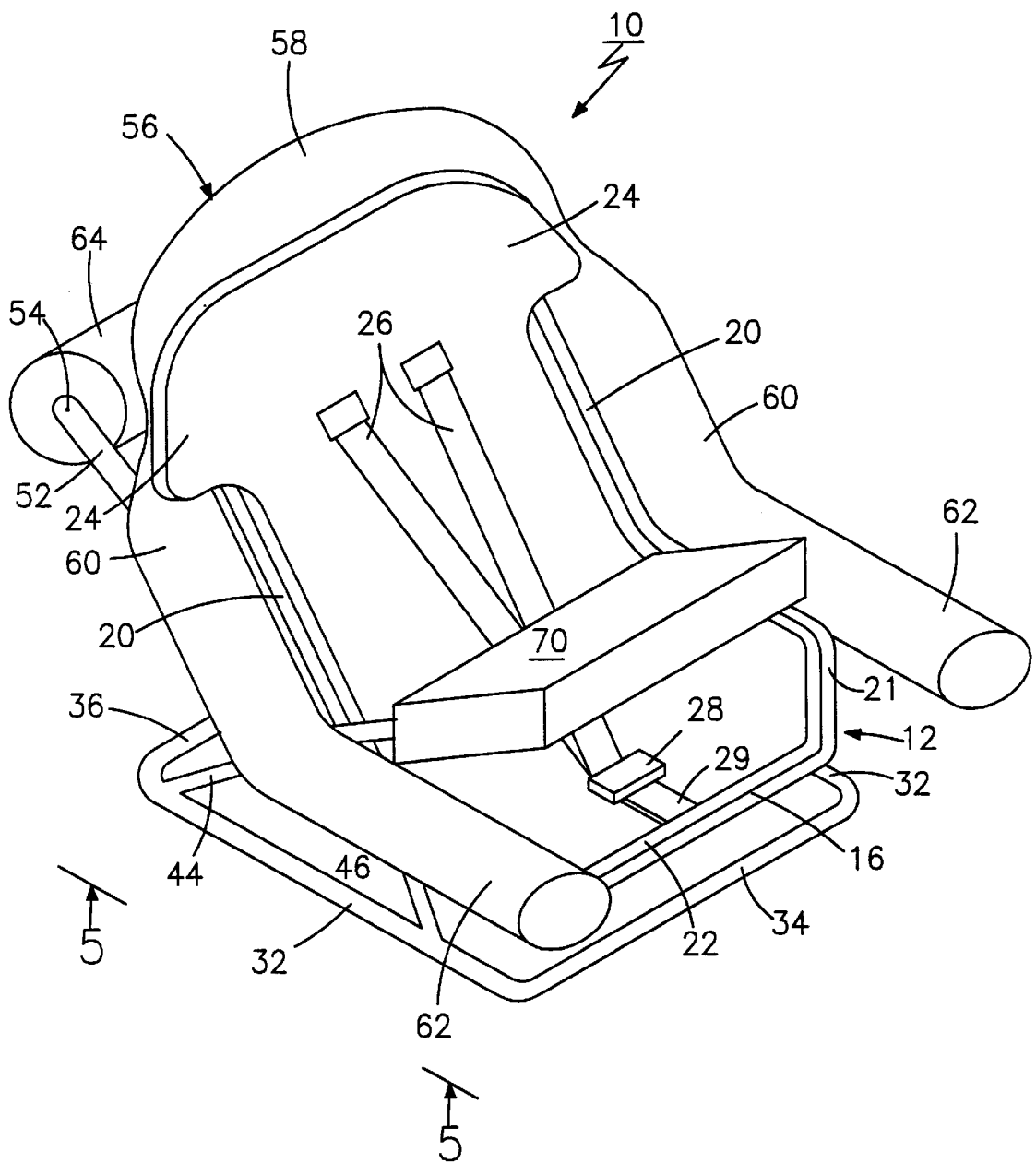
FIG. 1 is a perspective view of the floatable motor vehicle/boat child safety seat.

A floatable motor vehicle/boat child safety seat 10 shown generally in FIG. 1 is usable in both a motor vehicle environment and a marine environment and includes a typical automotive child safety seat 12 that meets the safety requirements for motor vehicles. The automotive child safety seat 12 as shown herein is only one example of a number of designs for child automotive safety seats and is described herein for only for purposes of exposition. Automotive child safety seat 12 includes a rigid bucket seat 14 that comprises a generally horizontal bucket seat bottom wall 16, a seat back wall 18, and opposed bucket seat upper side walls 20 that extend generally laterally from bottom wall 16 and back wall 18 in a downwardly angled direction parallel to bucket seat back wall 18 and bucket seat lower side walls 21 that extend in a generally horizontal direction parallel to bucket seat bottom wall 16. Back wall 18 is preferably slightly tilted rearwardly from the vertical. Typical child automotive safety seat 12 also includes a cushion 22 that is contoured to fit over bucket seat 14 and is secured at bottom wall 16, back wall 18 and upper and lower side walls 20 and 21. Cushion 22 also includes head-protective side wings 24 that extend outwardly from back wall 18. Automotive child safety seat 12 is for holding a young child and protecting the child from injury in the event of a sudden movement or collision. Automotive child safety seat 12 also similarly protects a young child from sudden movements in a marine environment. Automotive child safety seat 12 includes a pair of shoulder safety straps 26 secured to cushion 22 and removably connected to a crotch safety buckle 28 in turn secured by a crotch sasfety strap 29 to cushion 22.

Figure 7:
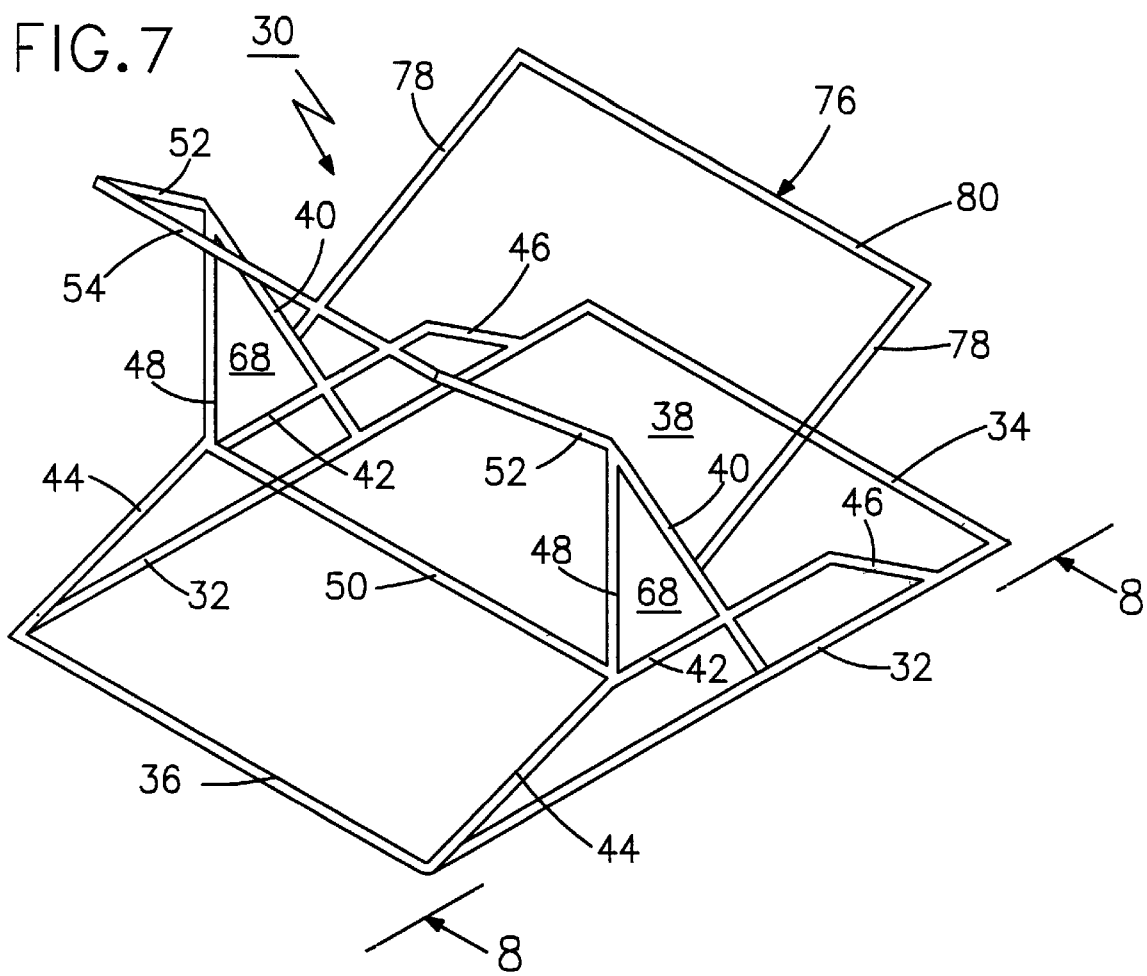
FIG. 7 is a perspective view of the frame/ballast portion of the floatable motor vehicle/boat child safety seat shown in FIG. 1.
Figure 8:
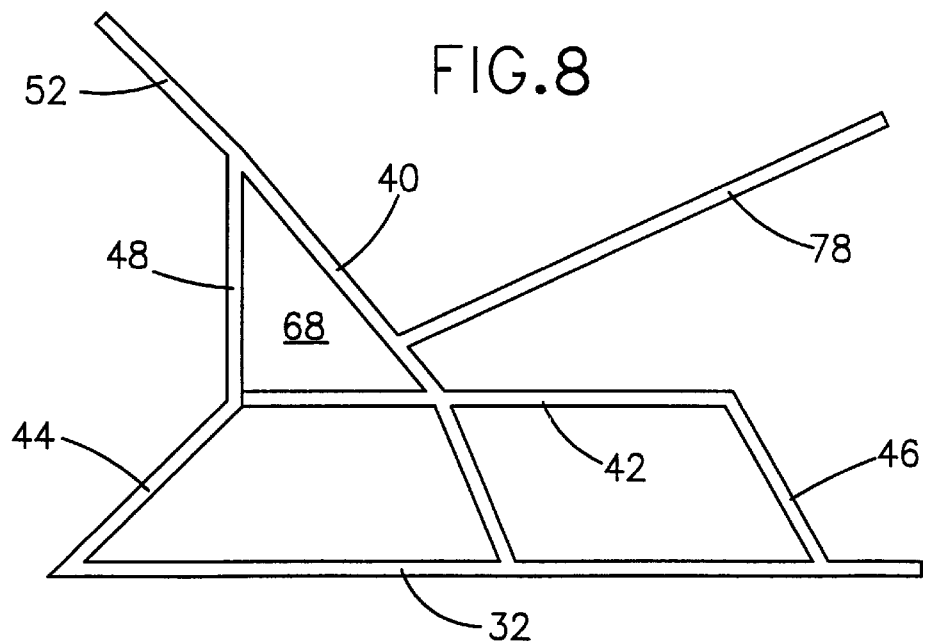
FIG. 8 is a side view taken through plane 8—8 in FIG. 7.

Floatable child safety seat 10 includes a support frame 30 shown in isolation in FIGS. 7 and 8 that is secured in a manner known in the art to child safety seat 12. Support frame 30 includes parallel bottom side support bars 32 and parallel bottom front and rear support bars 34 and 36, respectively, that together define a rectangular planar surface 38 that is compatible with placing support frame 30 along with connected child safety seat 12 on a horizontal surface of a motor vehicle or a water craft.

Support frame 30 includes a pair of rearwardly angled side support bars 40 connected generally midway to bottom side support bars 32. Support frame 30 further includes a pair of parallel upper support side bars 42 that are positioned horizontally and directly above bottom side support bars 32 and that are connected to a pair of parallel forwardly angled rear support bars 44 and a pair of parallel rearwardly angled front support bars 46. Angled rear support bars 44 and angled front support bars 46 in turn are connected to bottom side support bars 32. Angled side support bars 40 are also connected to upper side support bars 42. A pair of parallel vertical parallel support bars 48 are connected to and extend vertically upward from connection to the rear end of upper side support bars 42 and are also connected to the top of angled side support bars 40. A horizontal rear crossbar 50 is positioned forwardly and upwardly from and parallel to bottom rear support bar 36 and is connected to the junctions of upper side support bars 42 and vertical support bars 48. A pair of parallel rearwardly angled upper support bars 52 are connected to the junction of angled side support bars 40 and vertical support bars 48 with the rearward angle being greater than the rearward angle of angled side support bars 40. A horizontal upper rear crossbar 54 parallel to and spaced upwardly from rear crossbar 50 is connected to the upper ends of rearwardly angled upper support bars 52.

Figure 2:
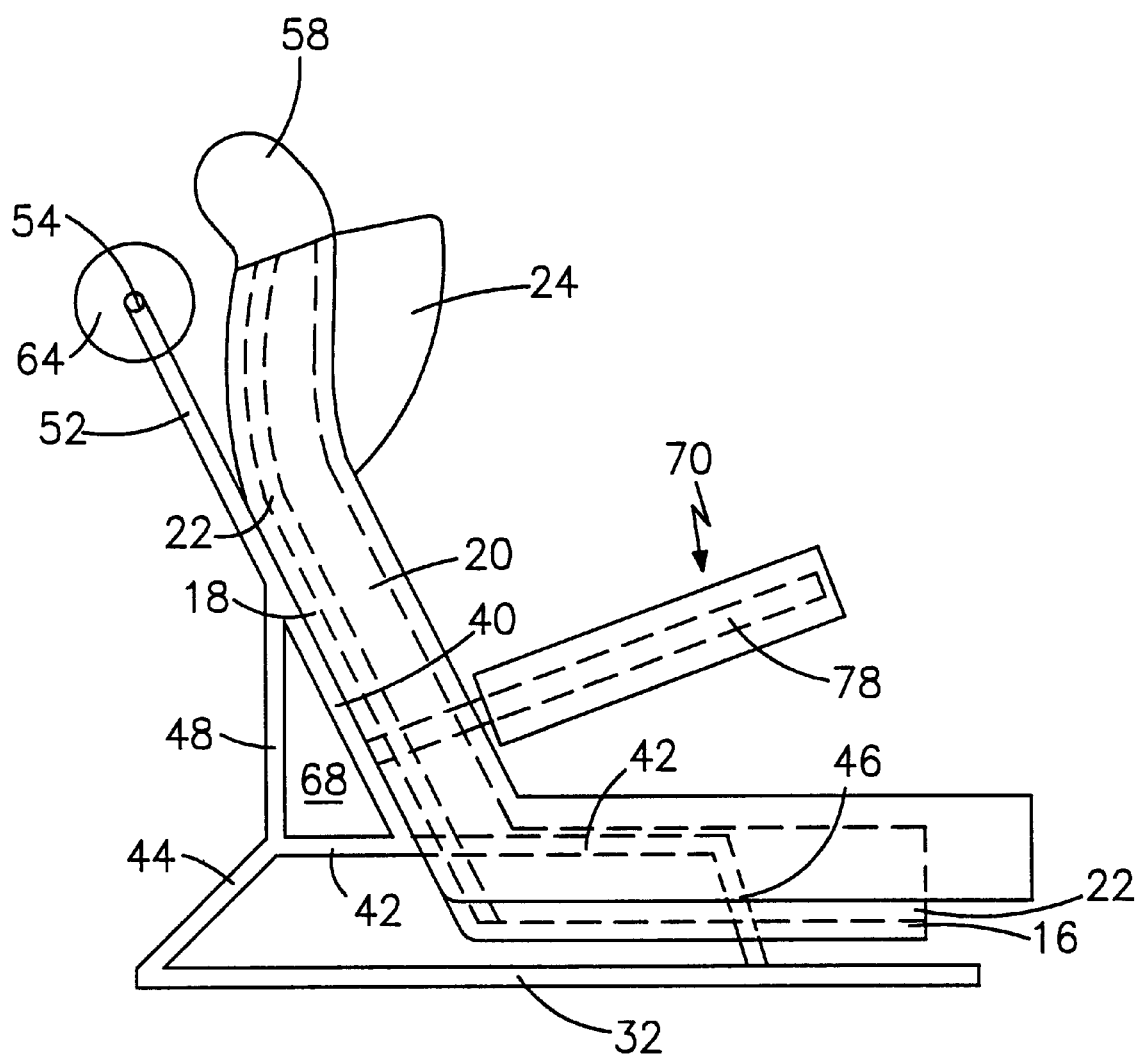
FIG. 2 is a side view taken through plane 2—2 in FIG. 1.
Figure 3:
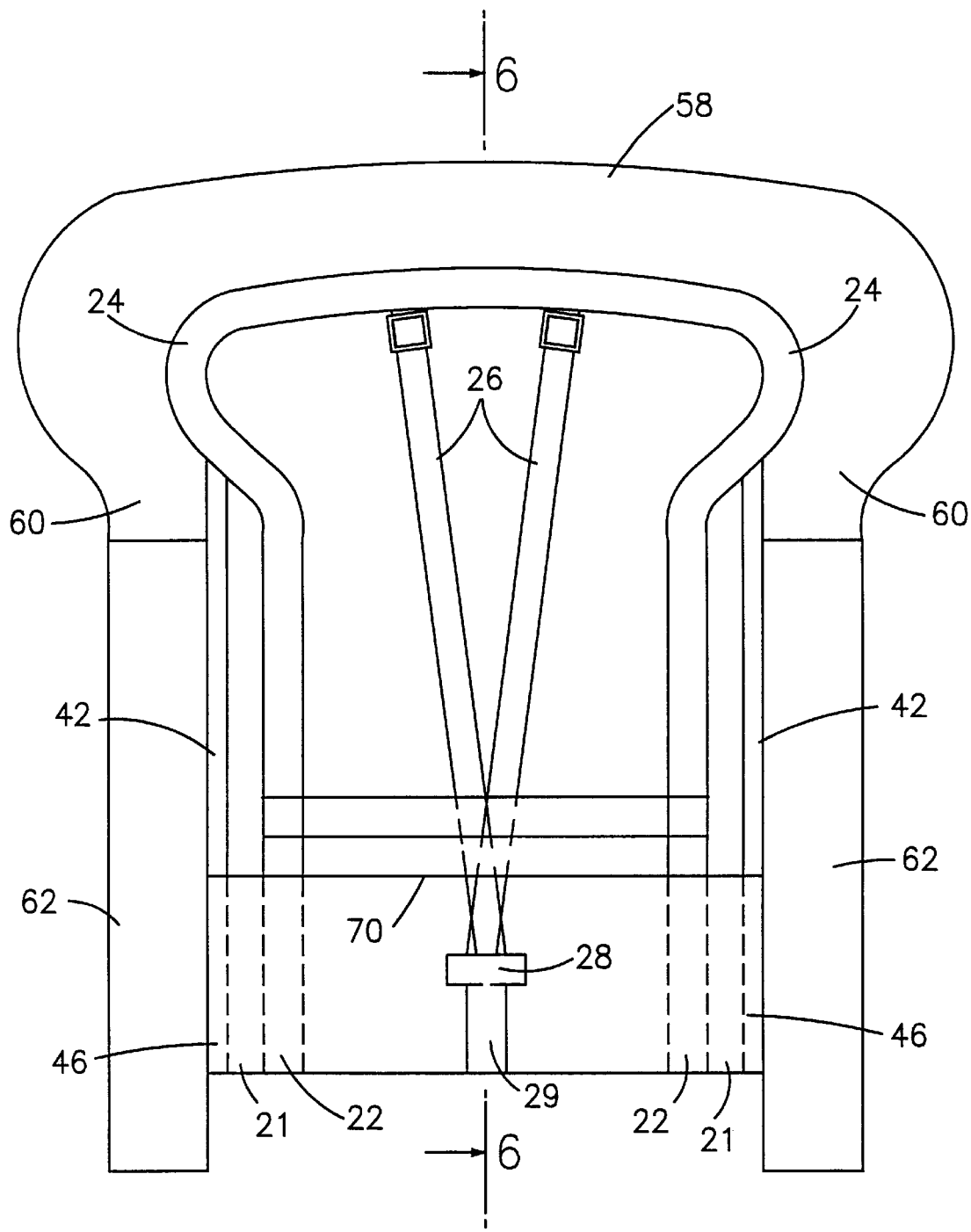
FIG. 3 is a top view taken through plane 3—3 in FIG. 1.
Figure 4:
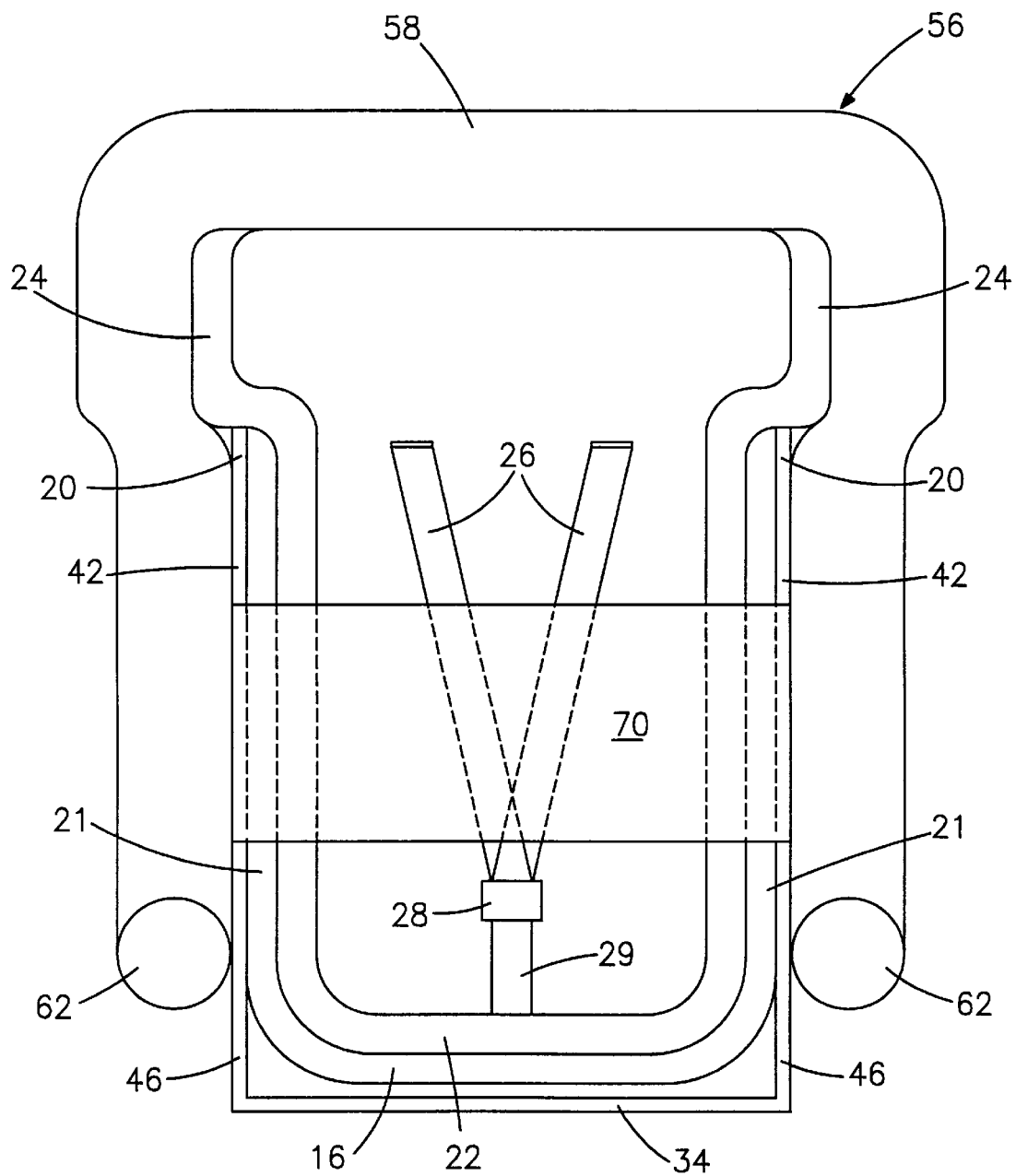
FIG. 4 is front view taken through plane 4—4 in FIG. 1.
Figure 5:
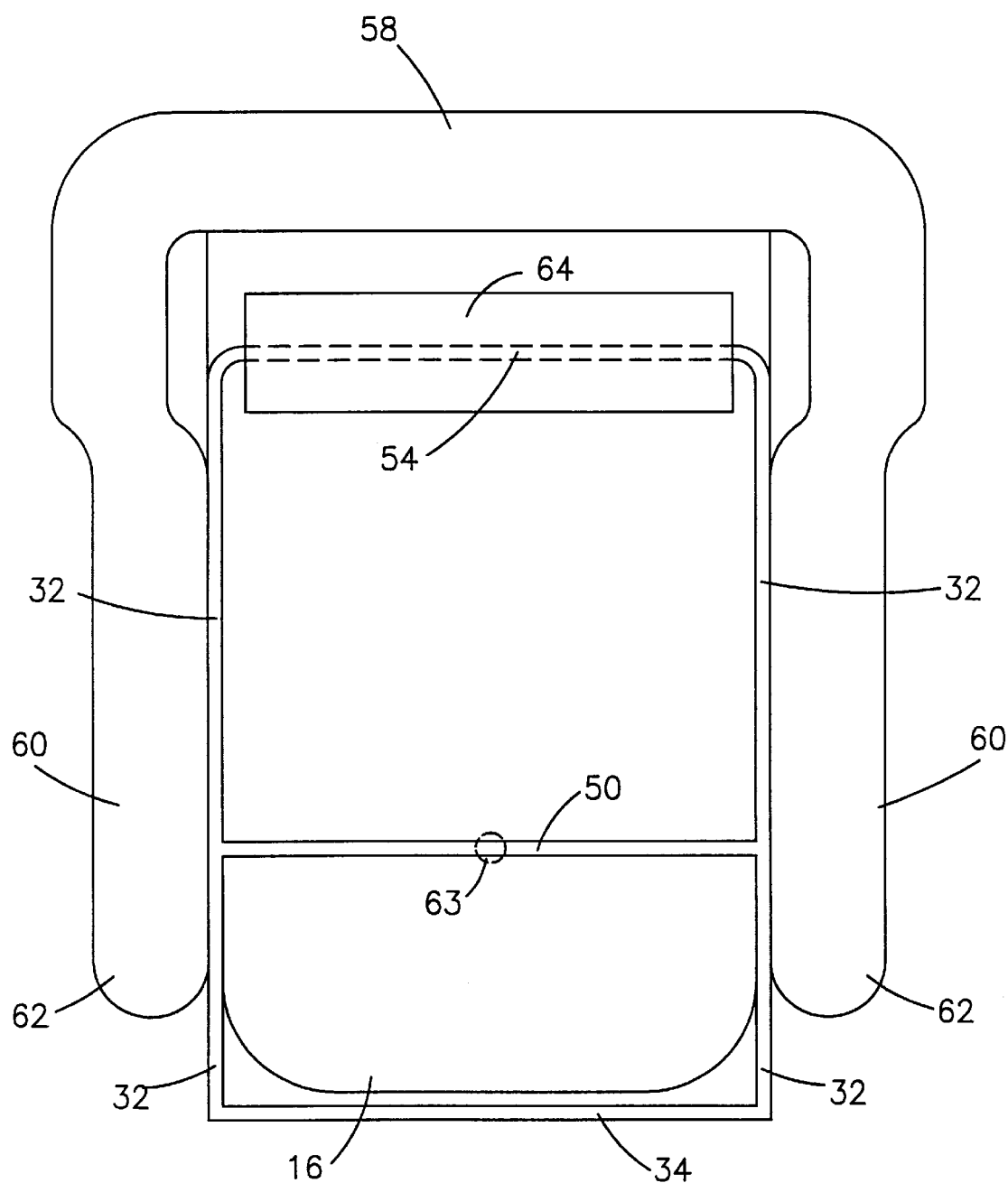
FIG. 5 is a rear view taken through plane 5—5 in FIG. 1.
Figure 6:
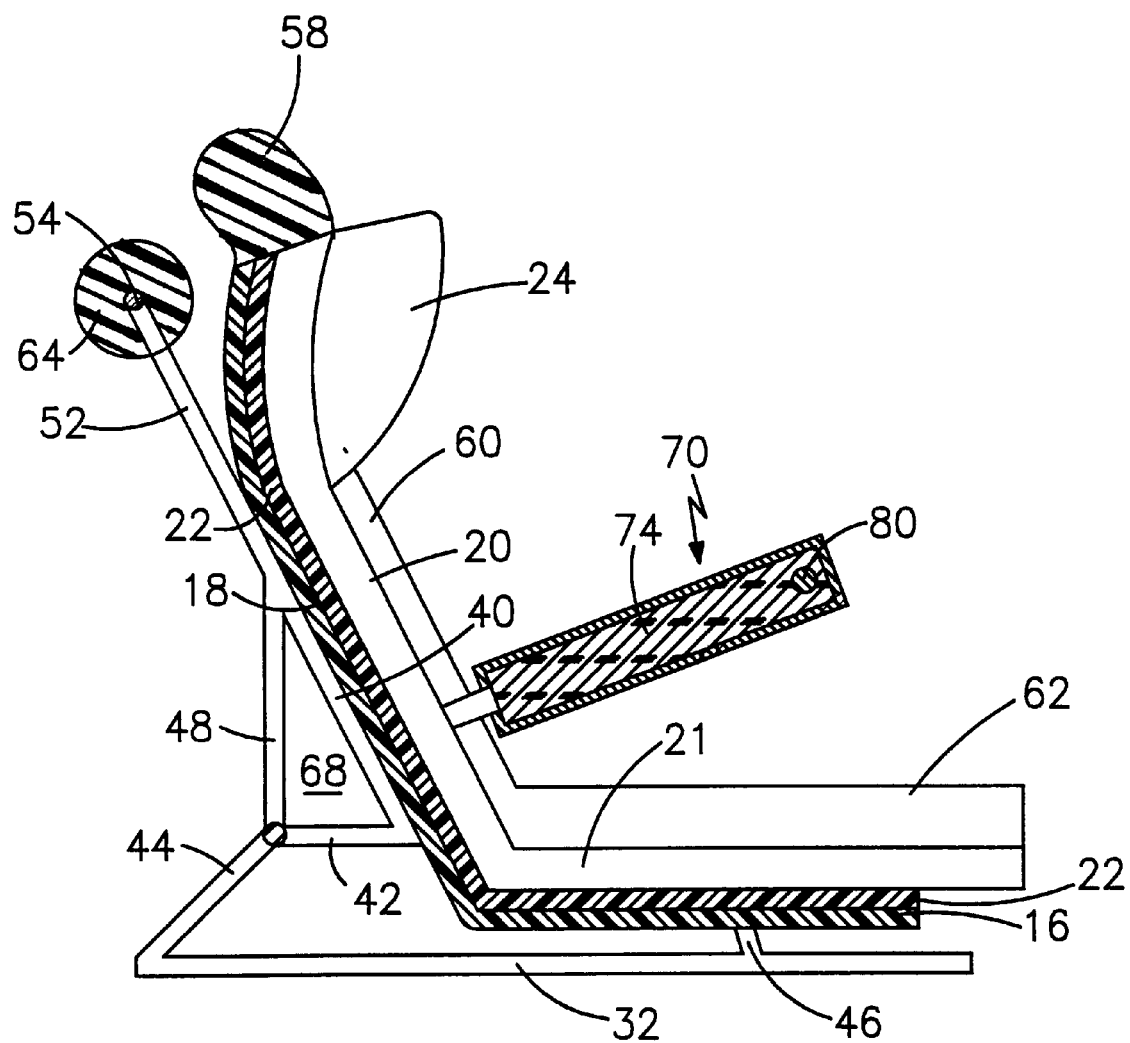
FIG. 6 is a side sectional view taken through line 6—6 in FIG. 3.

As indicated in FIGS. 2 and 6, bucket seat 14 is secured to support frame 30. In particular, back wall 18 is in contact with and secured in a manner known in the art to rearwardly angled side support bars 40. In addition, bucket seat lower side walls 21 are in contact with and secured in a manner known in the art to upper side support bars 42. Bucket seat bottom wall 16 is positioned at the horizontal at a distance above and parallel to planar surface 38.

As shown in FIGS. 1–9 floatable child safety seat 10 includes a unitary generally U-shaped floatation structure 56 made of a material that provides buoyancy in water. Floatation structure 56 includes a floatation top portion 58 positioned generally horizontally along and connected to the top side of bucket seat back wall 18, a pair of downwardly angled floatation side portions 60 secured in a manner known in the art to bucket seat upper side walls 20 and a pair of floatation horizontal side portions 62 secured in a manner known in the art to bucket seat lower side walls 21. Floatation structure 56 is secured to bucket seat 14 directly or is indirectly secured to bucket seat 14 by way of connection to support frame 30. Floatation structure 56 is made of any suitable low density material, such as a low density plastic material, such as a closed cell polyurethane foam material. Floatation Structure 56 is particularly situated and positioned so that floatation top portion 58 is spaced rearwardly from the center of gravity 63 (FIGS. 5 and 11) of floatable child safety seat 10 so as to provide an outrigger-type lateral stability to floatable child safety seat 10 in water. Floatation horizontal side portions 62 are equally spaced transversely from the center of gravity 63 so as to provide an outrigger-type lateral stability to floatable child safety seat 10 in water.

Also as shown in FIGS. 1–9, floatable child safety seat 10 further includes a rear cylindrical floatation structure 64 made of a bouyant material that is mounted around horizontal upper crossbar 54. Rear cylindrical floatation structure 64 is spaced farther from bucket seat back wall 18 and from the center of gravity 63 than floatation top portion 58 so as to provide further outrigger-type lateral stability to floatable child safety seat 10 in water.

Floatable child safety seat 10 includes a ballast, suitably disposed below the safety seat's center of gravity, and attached to or cooperatively associated with support frame 30 for maintaining child safety seat 12 upright and improving the stability of floatable child safety seat 10 in water. Support frame 30, as best shown in FIGS. 7–8 can be made of any type of solid metal to provide ballast. Alternatively, support frame 30 can be made of a tubular metal and filled with metal shot (not shown) to achieve ballast or, if desire, solid, lead ballast(s) may be secured to one or more of the bottom support bars 32, 34 and 36 or to other sections of said frame.

Floatable child safety seat 10 includes a pair of triangular securing grips 68 defined by pair of angled side support bars 40, pair of upper side support bars 42 and pair of vertical support bars 48 that provide attaching areas for a removable strap or straps known in the art (not shown) that pass through grips 68 and that in turn are attached to the surface of a motor vehicle or water craft so as to restrain the movements of floatable child safety seat 10.

An optional floatable armrest tray 70 shown in FIGS. 1–6 includes an outer protective layer 72 surrounding an inner floatable material 74. Armrest tray 70 is supported by an armrest support frame 76 shown in isolation in FIGS. 7 and 8 that includes a parallel pair of angled slightly upwardly armrest support bars 78 that are each connected at each of their ends to angled side support bars 40. A cross-support bar 80 is in turn connected to each of armrest support bars 78. Armrest support bars 78 and cross-support bar 80 extend through and support inner floatable material 74. Floatable material 74 is made of any suitable low density material, such as a low density plastic material, such as a closed cell polyurethane foam material.

FIGS. 9 and 10 show bucket seat 14 with added floatation material 82 affixed in any of various manners known in the art, for example by gluing or by riveting, to the rear side of bucket seat bottom wall 16 and the rear side of bucket seat back wall 18, in order to increase the floatation capacity of floatable child safety seat 10.

FIG. 11 indicates various desirable and theoretically achievable positions of floatable child safety seat 10 in water, for purposes of exposition as fresh water, with various levels of immersion relative to the surface of the water in accordance with the body weight of a child therein and with no child. The exemplary body weights of the children are zero (safety seat being empty), 10 pounds, 20 pounds, 30 pounds, and 40 pounds with associated chin levels of A, B, C, D, and E, respectively, relative to water levels shown as $A_1$, $B_1$, $C_1$, $D_1$, and $E_1$, respectively.

Exemplary specifications for floatable child safety seat 10 are as follows:

| Floatable Carrier Dry Weights (approximate) | |
| --- | --- |
| Total components dry weight | 12 pounds |
| Molded seat with armrest tray, liner, straps, and buckles | 2 pounds |
| Understructure frame | 9.6 pounds |
| Floatation material | 0.4 pounds |
| Ballast Contributions (approximate) | |
| Total components | 9.5 pounds |
| Understructure frame | 9.4 pounds |
| Molded seat, tray shell, straps, etc | 0.1 pounds |
| Floatation Contributions (approximate) | |
| Total components | 4.1 pounds |
| Low density foam plastics | 40 pounds |
| All other components (negligible) | 1 pound |

Floatation Distribution (approximate)

50% forward and 50% aft of center of gravity. Virtually all floatation is at the molded seat compartment perimeter with 40% of all floatation centered within 4 inches of the fore and aft edges of the molded seat compartment.

Floatation Characters and Vertical Distribution (approximate)

Submerged portions of infant body has natural buoyancy. (One cc. of water or one cc. of body mass=one gram (specific gravity=1.0)

Line A—(safety seat empty), 5,500 or 29% of floatation material submerged, 71% above water level.

Line B—(with 10 pound child, 50% of child submerged), 7,773 ccs. or 41% of floatation material submerged, 59% above water level.

Line C—(with 20 pound child, 55% of child submerged), 9,591 ccs. or 50% of floatation material submerged, 50% above water level.

Line D—(with 30 pound child, FILL of child submerged), FILL ccs. or FILL of floatation material submerged, FILL % above water level.

Line E—(with 40 pound child, 65% of child submerged), 11,864 ccs. or 62% of floatation material submerged, 38% above water level.

Although the present invention has been described in some detail by way of illustration and example for purposes of clarity and understanding, it will, of course, be understood that various changes and modifications may be made in the form, details, and arrangements of the parts without departing from the scope of the invention set forth in the following claims.

What is claimed is:

1. A child safety seat, comprising, safety seat means for holding a child so that the child is protected from injury in the event of sudden movement in both an automotive environment and a marine environment including a safety strap for removably holding the child to said safety seat means, frame means for holding said safety seat means in a generally upright position and further for defining a planar surface that is compatible with placing said safety seat means on the surface of a seat of a motor vehicle and on the surface of a water craft, said frame means being connected to said safety seat means, flotation means secured to said safety seat means for floating said safety seat means in water so that the head of the child is maintained above water level; said floatation means includes a primary floatation structure connected to said safety seat means, and said primary floatation structure being made of a buoyant material, ballast means cooperatively associated with said frame means for maintaining said safety seat means upright in water, and securing means connected to said safety seat means for providing a grip for removably holding said safety seat means to the surface of a motor vehicle or to the surface of a water craft; and wherein said child safety seat has a center of gravity and said primary floatation structure includes an upper rear floatation portion oriented horizontally transverse to said safety seat means and spaced rearwardly from said center of gravity of said child safety seat.

2. The child safety seat of claim 1, wherein said floatation structure includes a parallel pair of downwardly angled floatation portions connected to opposite ends of said upper rear floatation portion and a parallel pair of lateral horizontal side floatation portions connected to said angled floatation portions each spaced on opposite sides from said center of gravity.

3. The child safety seat of claim 2, wherein said frame means includes a pair of parallel bottom side support bars laterally oriented relative to said safety seat means and a pair of parallel side support bars transversely oriented relative to said safety seat means connected to said pair of bottom side support bars so as to form a horizontal planar surface, wherein said planar surface is in contact with the generally horizontal surface of seat of a motor vehicle and the surface of a water craft.

4. The child safety seat of claim 2, further including a secondary rear floatation structure connected to said safety seat means, said secondary rear floatation structure being positioned parallel to said rear floatation portion of said floatation structure and more distant rearwardly from said center of gravity than said rear floatation portion.

5. The child safety seat of claim 2, wherein said safety seat means includes a safety seat including a seat bottom wall, a seat back wall, seat upper side walls extending downwardly from said back wall and seat lower side walls extending horizontally from said bottom wall, said floatation top portion being connected to said seat back wall and said pair of floatation downwardly angled portions and said pair of floatation horizontal side portions each being positioned along said seat upper side walls and said seat lower side walls, respectively.

6. The child safety seat of claim 1, further including armrest means connected to said safety seat means for providing an armrest for a child in said safety seat means and including armrest floatation material for aiding in floating said safety seat means in water so that the head of the child is maintained above water level, said armrest floatation material being in addition to said floatation means, said armrest floatation material being a low density material.

7. The child safety seat of claim 1, wherein said buoyant material being a low density material.

8. The child safety seat of claim 7, wherein said low density material is a low density plastic material.

9. The child safety seat of claim 8, wherein said low density plastic material is a closed cell polyurethane foam material.

10. A child safety seat, comprising, safety seat means for holding a child so that the child is protected from injury in the event of sudden movement in both an automotive environment and a marine environment including a safety strap for removably holding the child to said safety seat means, frame means for holding said safety seat means in a generally upright position and further for defining a planar surface that is compatible with placing said safety seat means on the surface of a seat of a motor vehicle and on the surface of a water craft, said frame means being connected to said safety seat means, floatation means secured to said safety seat means for floating said safety seat means in water so that the head of the child is maintained above water level, ballast means cooperatively associated with said frame means for maintaining said safety seat means upright in water, securing means connected to said safety seat means for providing a grip for removably holding said safety seat means to the surface of a motor vehicle or to the surface of a water craft; and wherein said frame means includes a parallel pair of armrest support bars oriented lateral to said safety seat means and an armrest cross-support bar oriented transverse to and connected to the ends of said pair of armrest support bars, an armrest floatation material enclosing and being supported by said pair of armrest support bars and said armrest cross-support bar, and said frame means further including a cover for said armrest floatation material.

11. A child safety seat, comprising, safety seat means for holding a child so that the child is protected from injury in the event of sudden movement in both an automotive environment and a marine environment including a safety strap for removably holding the child to said safety seat means, frame means for holding said safety seat means in a generally upright position and further for defining a planar surface that is compatible with placing said safety seat means on the surface of a seat of a motor vehicle and on the surface of a water craft, said frame means being connected to said safety seat means, floatation means secured to said safety seat means for floating said safety seat means in water so that the head of the child is maintained above water level, ballast means cooperatively associated with said frame means for maintaining said safety seat means upright in water, securing means connected to said safety seat means for providing a grip for removably holding said safety seat means to the surface of a motor vehicle or to the surface of a water craft; and wherein said securing means includes said frame means including a parallel pair of first, second, and third support bars defining a pair of laterally oriented planar triangular grips.

* * * * *